US010384369B2

(12) United States Patent
Sariego et al.

(10) Patent No.: US 10,384,369 B2
(45) Date of Patent: Aug. 20, 2019

(54) EXTRUSION SYSTEMS AND METHODS WITH TEMPERATURE CONTROL

(71) Applicant: CORNING INCORPORATED, Corning, NY (US)

(72) Inventors: Kenneth Charles Sariego, Beaver Dams, NY (US); Joel Andrew Schultes, Corning, NY (US)

(73) Assignee: Corning Incorporated, Corning, NY (US)

( * ) Notice: Subject to any disclaimer, the term of this patent is extended or adjusted under 35 U.S.C. 154(b) by 795 days.

(21) Appl. No.: 13/690,642

(22) Filed: Nov. 30, 2012

(65) Prior Publication Data

US 2014/0151915 A1 Jun. 5, 2014

(51) Int. Cl.
*B29B 13/00* (2006.01)
*B28B 3/20* (2006.01)
*B28B 3/26* (2006.01)

(52) U.S. Cl.
CPC ............ *B28B 3/201* (2013.01); *B28B 3/2654* (2013.01)

(58) Field of Classification Search
CPC ...................... B29C 2947/92409; B29C 47/92
See application file for complete search history.

(56) References Cited

U.S. PATENT DOCUMENTS 3,335,459 A 8/1967 Tyrner .............................. 18/12
3,341,388 A * 9/1967 Bunyea .................... 156/244.23
3,521,325 A 7/1970 Schippers ......................... 18/12
3,675,451 A 7/1972 Aisenberg et al. ............... 72/20
3,919,384 A 11/1975 Cantaloupe et al. ...... 264/177 R
4,137,028 A * 1/1979 Reitemeyer ........... B29C 47/901 264/209.1
4,332,543 A 6/1982 Fulton et al. ................. 425/461
4,364,881 A 12/1982 Mizuno et al. ................ 264/4.7
(Continued)

FOREIGN PATENT DOCUMENTS

CN 1191853 A 9/1998
CN 201736430 2/2011 ............. B29C 47/38
(Continued)

OTHER PUBLICATIONS

Patent Cooperation Treaty International Notification of Transmittal of the International Search Report and the Written Opinion of the International Searching Authority, international application No. PCT/US2013/071772; dated Feb. 5, 2014, 13 pages.
(Continued)

*Primary Examiner* — Galen H Hauth

(57) ABSTRACT

Extrusion systems and methods with temperature control are disclosed. The ceramic batch material is flowed through a front section wherein the temperature of the batch material is locally adjusted through its perimeter at multiple locations. The temperature-adjusted ceramic batch material is then extruded through the extrusion die to form the extrudate. Temperatures of the extrudate at multiple outer surface locations having different azimuthal positions are measured. The temperature adjustment of the ceramic batch material is then controlled in a first feedback loop to control the shape of the extrudate based on the measured outer surface temperatures. The front section can also be cooled using a second control loop.

13 Claims, 10 Drawing Sheets

(56) References Cited

U.S. PATENT DOCUMENTS

| | | | | |
|---|---|---|---|---|
| 4,480,981 | A * | 11/1984 | Togawa | B29C 47/92 264/40.6 |
| 4,720,251 | A | 1/1988 | Mallay et al. | 425/67 |
| 5,177,340 | A * | 1/1993 | Zaffiro | B29C 66/919 219/388 |
| 5,192,543 | A | 3/1993 | Irvin et al. | 425/378.1 |
| 6,457,550 | B1 | 10/2002 | Barry et al. | 181/224 |
| 6,620,354 | B1 * | 9/2003 | Bessemer et al. | 264/40.6 |
| 6,637,250 | B2 | 10/2003 | Plata et al. | 72/272 |
| 6,854,969 | B2 | 2/2005 | Shibagaki et al. | |
| 6,960,746 | B2 | 11/2005 | Chen | 219/659 |
| 7,276,194 | B2 | 10/2007 | Shalkey | |
| 7,361,226 | B2 | 4/2008 | Wyatt et al. | 118/667 |
| 8,747,729 | B2 | 6/2014 | Inoguchi | |
| 2002/0014710 | A1 * | 2/2002 | Tsuruta et al. | 264/40.6 |
| 2002/0167102 | A1 * | 11/2002 | Yamaguchi et al. | 264/40.1 |
| 2007/0034092 | A1 | 2/2007 | Lawrence et al. | 99/349 |
| 2007/0117061 | A1 | 5/2007 | Schwartz | 432/152 |

FOREIGN PATENT DOCUMENTS

| | | | | |
|---|---|---|---|---|
| JP | 2008137186 A | 6/2008 | | |
| NL | 1011140 | 7/2000 | B29C 47/02 |
| WO | WO-2010051430 A1 * | 5/2010 | B28B 3/201 |

OTHER PUBLICATIONS

English Translation of CN201380071934.8 First Office Action dated Aug. 3, 2016, China Patent Office, 11 Pgs.

English Translation of JP2015545159 Office Action dated Mar. 28, 2017, Japan Patent Office, 4 Pgs.

* cited by examiner

EXTRUSION SYSTEMS AND METHODS WITH TEMPERATURE CONTROL

FIELD

This disclosure is related to extrusion systems and methods, and in particular to such systems and methods used to extrude ceramic precursor batch material, wherein the extrusion process utilizes temperature control.

BACKGROUND

The process of forming a ceramic honeycomb and other ceramic-based articles involves extruding a ceramic precursor batch material (also referred to herein as "ceramic batch", "batch material", or "ceramic batch material") through a barrel and then through an extrusion die to form an extrudate. The extrudate is then processed (e.g., cut up, dried and fired) to form the final articles of manufacture.

The ceramic precursor batch material has temperature-dependent flow properties. Depending on the temperature, the batch material can either flow faster or slower through the extrusion die. Consequently, temperature differences in the batch material can cause flow non-uniformities that can adversely affect the shape of the extrudate and thus the shape of the final articles.

SUMMARY

Aspects of the disclosure include system and methods for locally controlling the temperature of ceramic batch material just prior to the material being extruded through an extrusion die to achieve a desired extrusion effect, such as a uniformly shaped extrudate. This temperature control is accomplished in one example by disposing heating elements relative to the extruder such that they surround the periphery of the ceramic batch material. The number of heating elements used defines the degree of temperature control of the ceramic batch material that can be achieved. A cooling system can also be used to locally adjust the temperature of the ceramic batch material. Thus, in an example, the local adjustment of the temperature of the ceramic batch material employs both heating and cooling to achieve a desired extrusion effect on the extrudate.

A first set of temperature sensors is operably positioned to measure the temperatures of multiple locations along the outer surface of the extrudate as it exits the extrusion die. An optional second set of temperature sensors is operably arranged to measure the temperatures of the heating elements, or the regions adjacent the heating elements, so that the amount of power provided to the heating elements can be controlled. This allows for the local temperature of the ceramic batch material to be adjusted in a controlled manner.

A temperature controller receives the measured temperatures of the outer surface of the extrudate and controls the amount of power that is sent to each heating element. The systems and methods may include a cooling system that cools the transition section between the extruder and the die. This transition section is referred to herein as the extruder front end. The cooling temperature set point can be set independently within a reasonable range, e.g., from about −30 ° C. to about 30° C. or from about −5° C. to about 30° C.

The cooling system can be operated independently of the temperature controller or can be operated in a control loop that includes the temperature controller. In an example, active cooling and heating coupled with the characteristic of a temperature-sensitive ceramic batch composition enables the systems and methods to control the extrudate's flow velocity, which translates into controlling the extrudate's shape.

An aspect of the disclosure is a method of controlling a shape of an extrudate made of a ceramic batch material extruded from an extrusion die of an extruder. The method includes flowing the ceramic batch material through an extruder cavity immediately adjacent the extrusion die, wherein the cavity has a central axis and defines a perimeter of the ceramic batch material. The method also includes locally adjusting the temperature of the ceramic batch material. The method further includes extruding the temperature-adjusted ceramic batch material through the extrusion die to form the extrudate, with the extrudate having an outer surface. The method additionally includes measuring temperatures of the extrudate at multiple outer surface locations having different azimuthal positions. The method also includes controlling the local temperature adjustment of the ceramic batch material based on the measured outer surface temperatures to control the shape of the extrudate.

Another aspect of the disclosure is an extrusion system for controlling the extrusion of a ceramic batch material to form an extrudate having an outer surface and a desired shape. The system includes an extruder having a long axis and a cavity configured to contain the ceramic batch material and containing at least one extrusion screw operable to cause a flow of the ceramic batch material. The system also includes an extrusion die operably arranged at an output end of the extruder. A front section of the extruder resides immediately adjacent the extrusion die. A plurality of heating elements is azimuthally arranged about at least a portion of the cavity periphery at the front section and is configured to provide, in response to power signals, localized heating of the ceramic batch material as it flows through the front section. A plurality of first temperature sensors is azimuthally arranged relative to the long axis at the extruder front end and is configured to make non-contact measurements of surface temperatures along the extrudate outer surface and generate first temperature signals that are representative of the measured surface temperatures. A temperature controller is operably connected to the plurality of heating elements and the plurality of first temperature sensors and is configured to receive the first temperature signals and control, via the power signals, the amounts of heat generated by each of the heating elements in response to the measured surface temperatures.

Another aspect of the disclosure is an extruder system for controlling the extrusion of a ceramic batch material to form an extrudate having an outer surface and a desired shape. The extruder system has an extrusion die having a first cavity and an output aperture and has a first extruder section arranged immediately adjacent the extrusion die and having a second cavity that is open to the first cavity. The system also has a second extruder section arranged immediately adjacent the first extruder section and configured to cause the ceramic batch material to flow through the second cavity to the first cavity and out of the extrusion die output end to form the extrudate. The system further includes a plurality of first temperature sensors azimuthally disposed about the extrusion die output aperture and operable to measure temperatures along the extrudate outer surface and in response thereto generate first temperature signals. The system has a plurality of first heating elements azimuthally disposed about the second cavity and operable to locally heat the ceramic batch material flowing through the second cavity in response to power signals. The system further includes a temperature control unit operably connected to the first temperature sensors and the heating elements. The temperature control unit is configured to receive the first temperature signals and control the power signals in a first control loop in order to control the amounts of heat generated by each of the heating elements in response to the measured surface temperatures.

It is to be understood that both the foregoing general description and the following Detailed Description represent embodiments of the disclosure and are intended to provide an overview or framework for understanding the nature and character of the disclosure as it is claimed. The accompanying drawings are included to provide a further understanding of the disclosure and are incorporated into and constitute a part of this specification. The drawings illustrate various embodiments of the disclosure and together with the description serve to explain the principles and operations of the disclosure.

Additional features and advantages of the disclosure are set forth in the Detailed Description that follows, and in part will be readily apparent to those skilled in the art from that description or recognized by practicing the disclosure as described herein, including the Detailed Description that follows, the claims, and the appended drawings.

The claims as set forth below are incorporated into and constitute a part of the Detailed Description set forth below.

Additional features and advantages of the disclosure are set forth in the Detailed Description that follows and will be apparent to those skilled in the art from the description or recognized by practicing the disclosure as described herein, together with the claims and appended drawings.

Cartesian coordinates are shown in certain of the Figures for the sake of reference and are not intended as limiting with respect to direction or orientation.

DETAILED DESCRIPTION

Figures 1A, 1B:
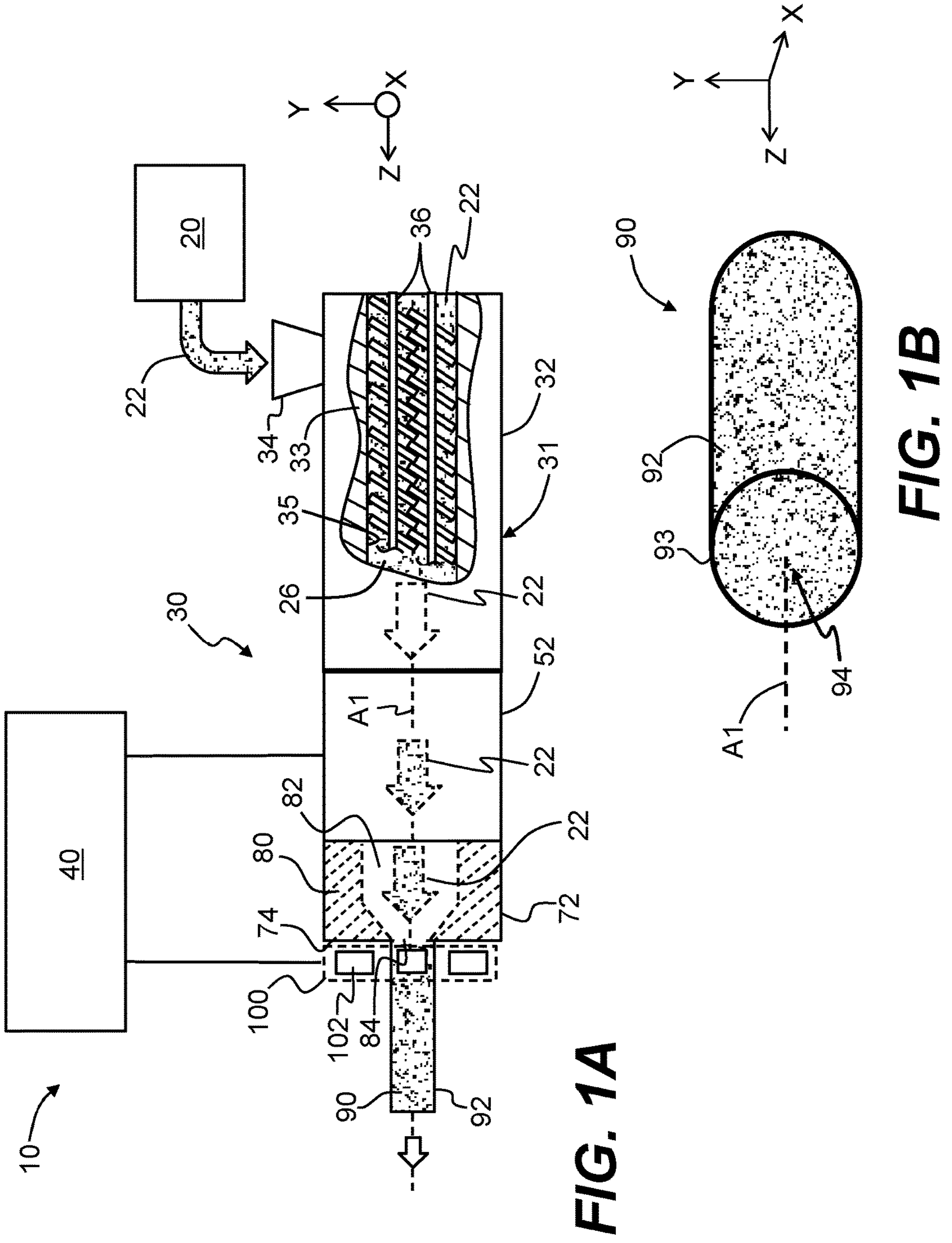
FIG. 1A is a schematic diagram of an example embodiment of the extrusion system according to the disclosure.
FIG. 1B is an elevated view of an example extrudate having a circular cross-section.

FIG. 1A is a schematic diagram of an example extrusion system ("system") 10 according to the disclosure. The system 10 includes a batch supply unit 20 that supplies ceramic batch material 22. The batch supply unit 20 may include, for example, a mixer that mixes the batch raw materials (raw minerals, water, oils, etc.), a rotary cone, a conveyor, and a chute (not shown), as is known in the art.

The system 10 also includes an extruder 30. The extruder 30 includes a barrel 31 with a long axis A1 and can be considered as having three main sections: an input section 32, a front section 52, and an output section 72. The output section 72 has an output end 74 and includes an extrusion die 80 having a die cavity 82 with a central opening 84 that is open at output end 74. Thus, front section 52 is immediately adjacent output section 72 and extrusion die 80 therein, and is not necessarily in the middle of or otherwise centrally located in extruder 30. Also, the nomenclature used herein that divides extruder 30 into different sections is somewhat arbitrary and is for ease of description, and is not intended as limiting the extruder to having such specific sections.

The input section 32 includes an input funnel 34 configured to receive ceramic batch material 22 from batch supply unit 20. In an example extruder 30, barrel 31 operably supports two extrusion screws 36 in a cavity 26 that runs along long axis A1. The cavity 26 is defined by an inner surface 35 of a barrel wall 33, with the inner surface defining the cavity periphery (i.e., the inner surface is also the cavity periphery). The rotation of extrusion screws 36 pushes ceramic batch material 22 forward through cavity 26 of barrel 31 from input section 32 through front section 52 and from cavity 26 therein into cavity 82 of extrusion die 80.

The ceramic batch material 22 is then extruded from central opening 84 of extrusion die 80 and out of output end 74 of output section 72. With reference also to FIG. 1B, the result is the formation of an extrudate 90 having an outer surface 92 and a core 94 that resides on axis A1. In an example, extrudate 90 comprises a plurality of longitudinal channels that form a honeycomb body as commonly used in flow-through substrates and wall flow filters. In an example, outer surface 92 is part of an outer skin 93 that has a thickness. In an example, skin 93 can have skin defects, such as air checks, fissures, ripples and collapsed portions. Example embodiments of the systems and methods below include reducing or eliminating skin defects, and affecting the skin thickness. It is also noted here that extrudate 90 can also have non-circular cross-sectional shapes, and that the circular cross-sectional shape is shown by way of example and for ease of illustration.

The front section 52 includes a temperature control system 40 configured to control the temperature of ceramic batch material 22 as it passes through cavity 26 at the front section. This is a simplified version that assumes for the sake of illustration that cavity 26 extends into front section 52. In other examples, there can be different cavities 26 in front section 52 and input section 32. The temperature control system 40 is described in greater detail below. The temperature control is localized, i.e., some portions of ceramic batch material 22 can be heated more than others so that different portions of the ceramic batch material can have different temperatures and thus different flow velocities. The temperature control system 40 can be used to selectively heat ceramic batch material 22 and can also be used to cool the ceramic batch material, as described below. Thus, ceramic batch material 22 has a temperature (which can include a temperature distribution) when residing in cavity 26, and the temperature is locally adjusted, either via heating or via a combination of heating and cooling, to form a temperature-adjusted ceramic batch material. The temperature-adjusted ceramic batch material is then extruded to form extrudate 90.

The system 10 includes a temperature-sensing unit 100 arranged adjacent output section 72 at output end 74. The temperature-sensing unit 100 is configured to make a non-contact measurement of the temperature of outer surface 92 of extrudate 90 as it exits extrusion die 80. The temperature-sensing unit 100 includes a plurality (i.e., a set) of temperature sensors 102 arranged adjacent outer surface 92 of extrudate 90. The temperature sensing unit 100 is operably connected to temperature control system 40.

Figure 2A:
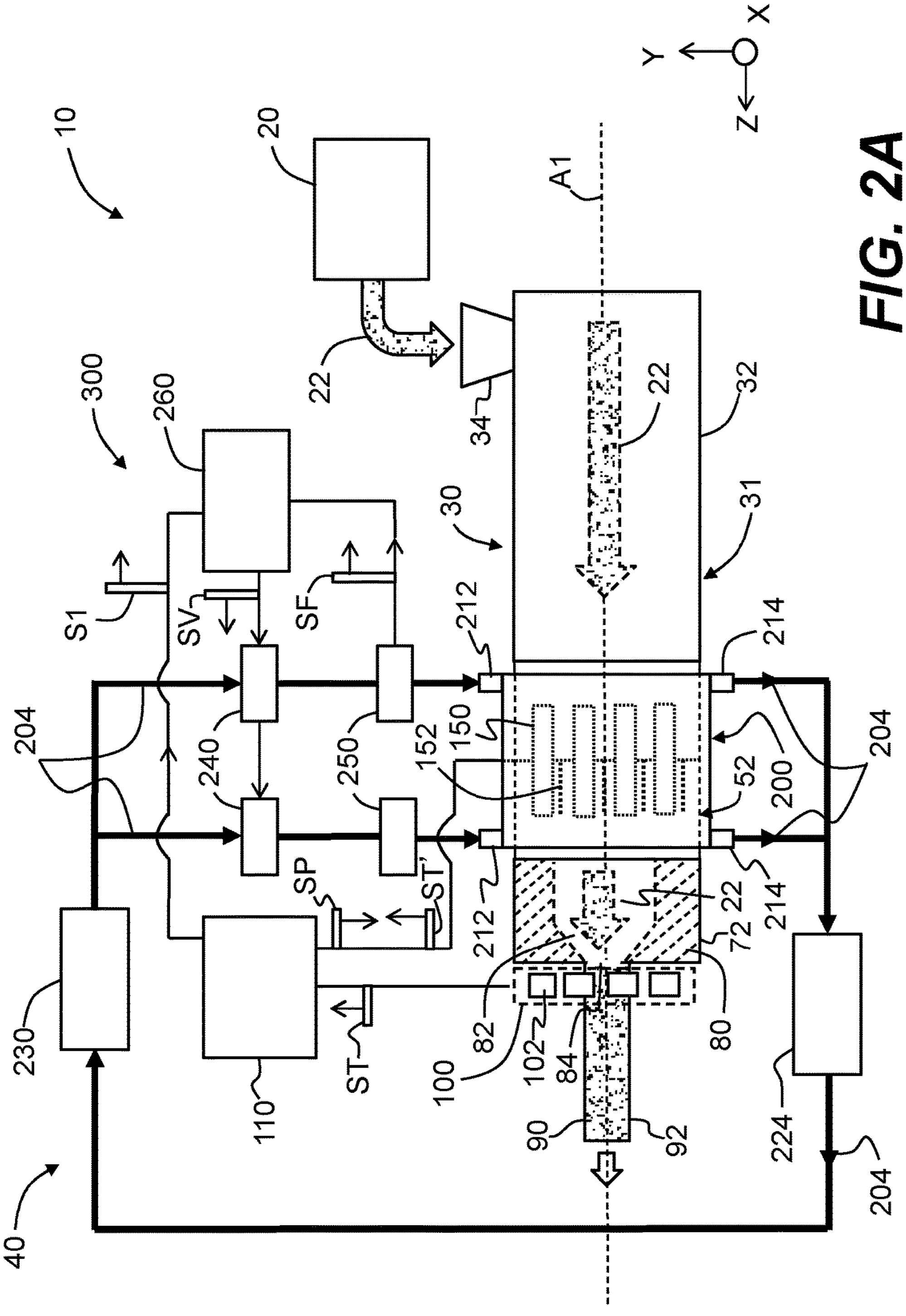
FIGS. 2A through 2C are schematic diagrams of the extrusion system according to the disclosure and showing more details of the temperature control system.
Figure 2B:
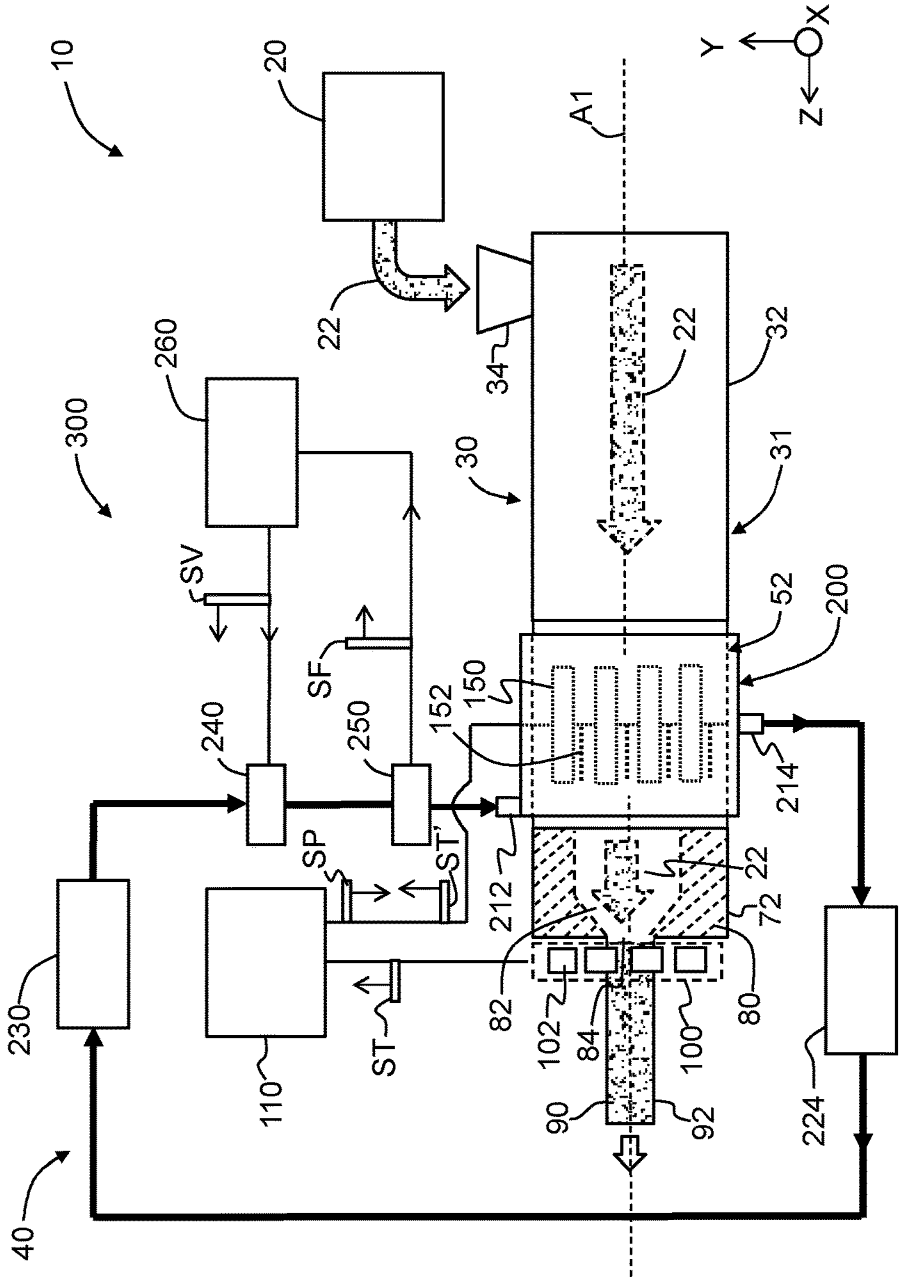
Figure 2C:
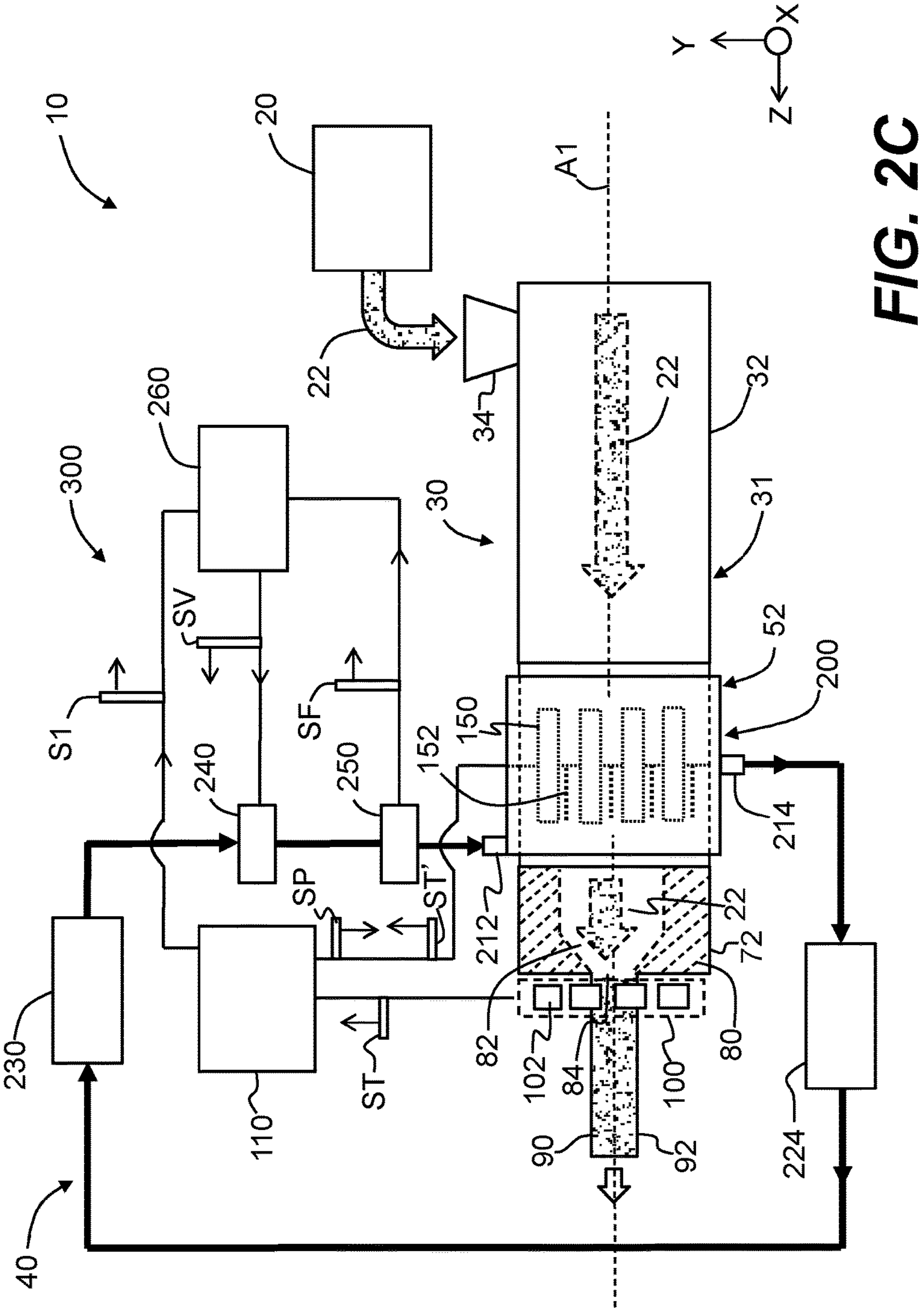

FIGS. 2A through 2C are more-detailed schematic diagrams of example embodiments of system 10. The temperature control system 40 includes a temperature controller 110 and an optional cooling system 300. The front section 52 of extruder 30 includes a plurality (i.e., a set) of heating elements 150 azimuthally arranged about long axis A1 and operable to perform localized heating, i.e., heating of different portions of ceramic batch material 22 as the batch material passes through cavity 26 (or to another cavity 26 in front section 52) at the front section. In an example embodiment, a plurality (i.e., a set) of temperature sensors 152 are also azimuthally arranged adjacent respective heating elements 150 to measure the temperature of the heating elements or the regions immediately adjacent the heating elements. In an example, temperature sensors 152 are thermocouples.

Figure 3B:
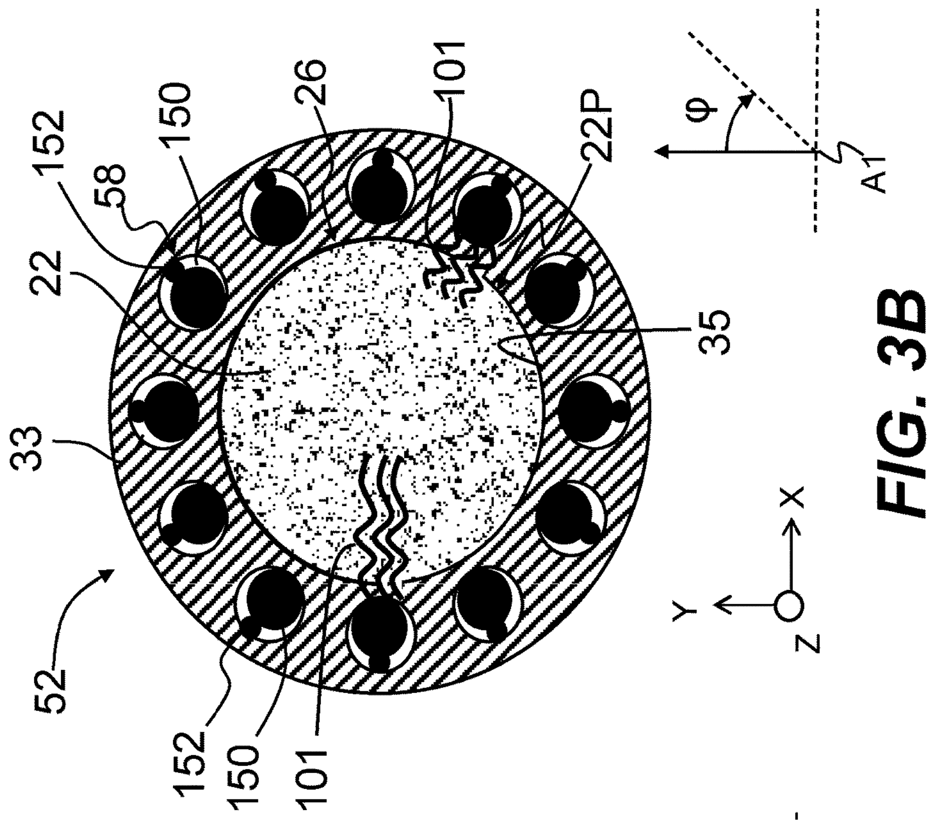
FIG. 3B is similar to FIG. 3A and shows the extruder barrel cavity filled with ceramic batch material and the heating-element bores each including a heating element and a temperature sensor.
Figure 3A:
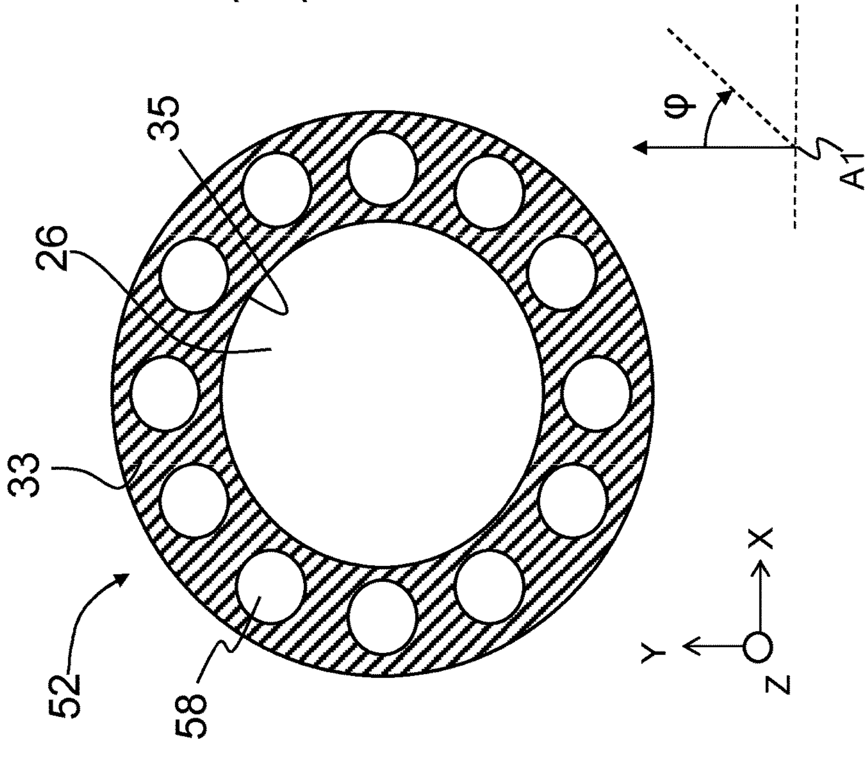
FIG. 3A is a cross-sectional view of an example front section of the extruder front section showing heating-element bores formed in the front-section wall, showing the barrel cavity and its periphery.

FIG. 3A shows an example cross-sectional view of front section 52, wherein front section barrel wall 33 is cylindrical and wall inner surface 35 defines a cylindrical barrel cavity 26. The cylindrical wall 33 can be made of metal, such as stainless steel, which has good thermal conductivity. When cavity 26 is filled with ceramic batch material 22, wall inner surface (i.e., cavity perimeter) 35 defines a ceramic batch material perimeter 22P (FIG. 3B). An azimuthal angle φ is shown for reference, and is measured relative to axis A1.

A plurality of longitudinal heating-element bores 58 that run generally parallel to barrel long axis A1 are formed in barrel wall 33. Each bore 58 is sized to accommodate one or more heating elements 150. In an example, each bore 58 is also sized to accommodate at least one temperature sensor 152. Twelve bores 58 are shown by way of example in FIG. 3A. However, any reasonable number of bores 58 can be used to accommodate a corresponding number of heating elements 150. In an example, bores 58 are arranged substantially equally spaced as a function of azimuthal angle φ.

The heating elements 150 are electrically connected to temperature controller 110, as shown in FIG. 2A. In an example, heating elements 150 are capable of generating up to 500 watts of heat. In an example, heating elements 150 can be grouped into groups or "banks," and the banks can be accommodated in respective bores 58. In an example, the number of temperature sensors 152 is the same as the number of heating elements 150 or is the same as the number of banks of heating elements.

FIG. 3B is similar to FIG. 3A, except that ceramic batch material 22 is shown within cavity 26, which defines the aforementioned perimeter 22P of the ceramic batch material. The heating elements 150 and temperature sensors 152 are shown disposed within each bore 58. The heating elements 150 are thus disposed around perimeter 22P of ceramic batch material 22 as the material flows though cavity 26 in front section 52.

The heating elements 150 generate heat 101 in proportion to the amount of electrical power they receive. The amount of heat 101 generated by each heating element 150 can be controlled by virtue of temperature controller 110 regulating the amount of electrical power it provides to each heating element via respective power signals SP. This power regulation gives rise to localized heating of ceramic batch material 22, which provides the ceramic batch material with a desired thermal profile when it exits front section 52 and enters extrusion die 80. In FIG. 3B, two of the heating elements 150 are shown generating different amounts of heat 101 by way of example. In one example, only a subset of heating elements 150 is activated by temperature controller 110 via power signals SP, while in another example all the heating elements are activated.

Figure 3C:
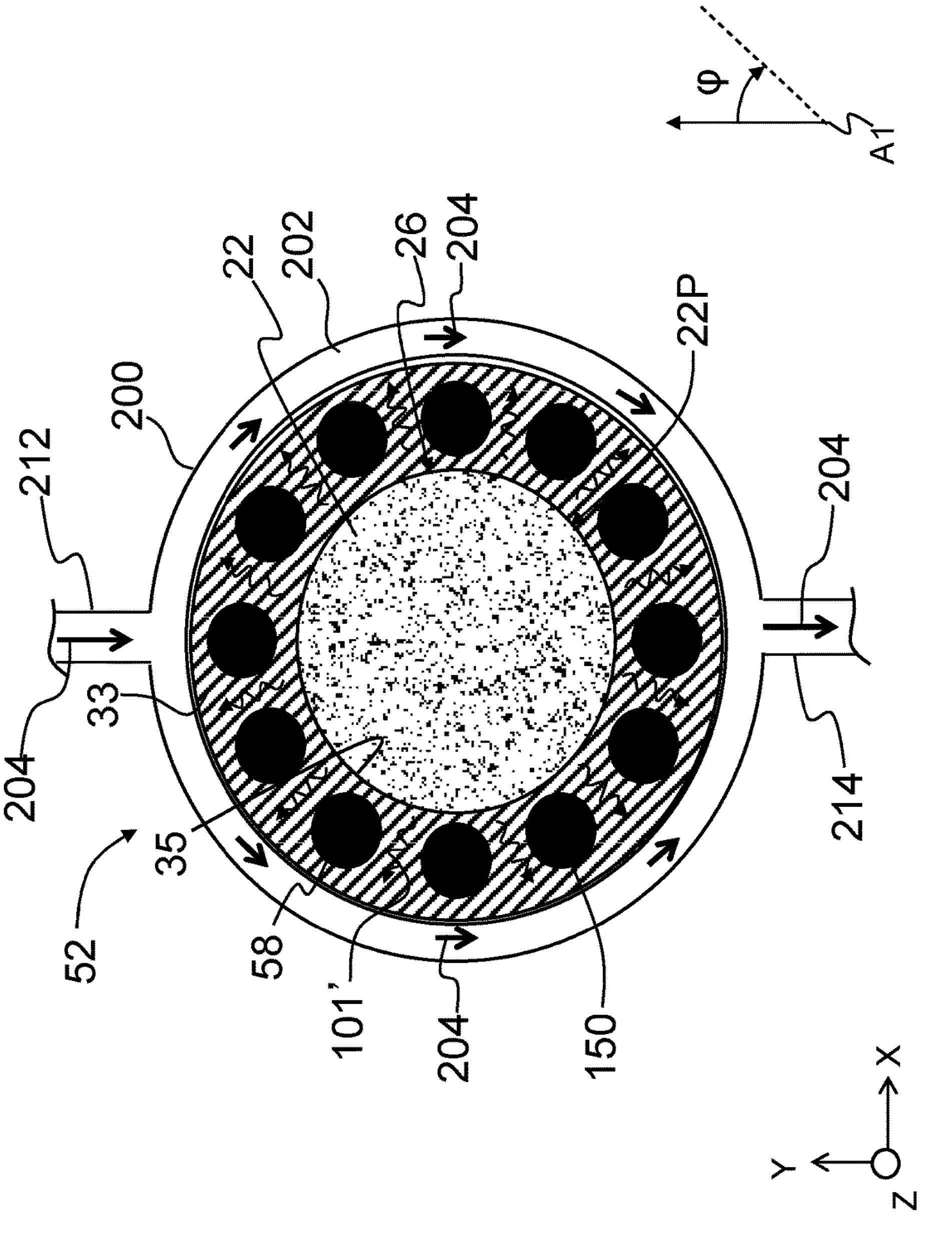
FIG. 3C is similar to FIG. 3B and additionally illustrates an example embodiment of a cooling jacket that resides on the outside of the front section.

FIG. 3C is similar to FIG. 3B, except that front section 52 includes an optional cooling jacket 200, which is also included in the example embodiments of system 10 shown in FIGS. 2A through 2C. The cooling jacket 200 at least partially surrounds the outside of front section 52 so that the cooling jacket is in thermal communication (e.g., intimate contact) therewith. In an example, cooling jacket 200 includes at least one cooling channel 202 through which a coolant 204 (e.g., water, glycol-water mixture, etc.) can flow. The cooling jacket 200 includes at least one input port 212 and at least one output port 214. An example cooling jacket 200 is in the form of one or more cooling coils. In an example, multiple cooling coils are configured to allow for different amounts of coolant flow as a function of azimuthal angle φ.

FIGS. 2A through 2C show an example system 10 where cooling jacket 200 is fluidly connected at output port 214 to a coolant return 224, which is fluidly connected to a coolant supply 230. The coolant supply 230 is fluidly connected to actuator valves 240, which are in turn respectively fluidly connected to flow meters 250. The flow meters 250 are also fluidly connected to input ports 212. The actuator valves 240 and flow meters 250 are electrically connected to a flow controller 260, which in an example is electrically connected to temperature controller 110. In an example, the aforementioned components of apparatus 10 associated with cooling front section 52 constitute cooling system 300. An example cooling system 300 includes or consists of a chiller system.

The flow of coolant 204 through cooling jacket 200 serves to remove heat 101' from ceramic batch material 22 (see FIG. 3C) as the ceramic batch material flows through cavity 26 in front section 52 and into extrusion die 80 in output section 72. While active cooling of the ceramic batch material 22 is not necessary, the passive cooling of the ceramic batch material can be relatively slow compared to the speed at which the ceramic batch material can be heated using active heating via heating elements 150. Active cooling using cooling system 300 thus serves to provide for relatively fast heating and cooling of ceramic batch material 22, thereby making apparatus 10 more responsive, i.e., able to perform local temperature adjustments of the ceramic batch material more rapidly than by only using heating elements 150.

Figure 4B:
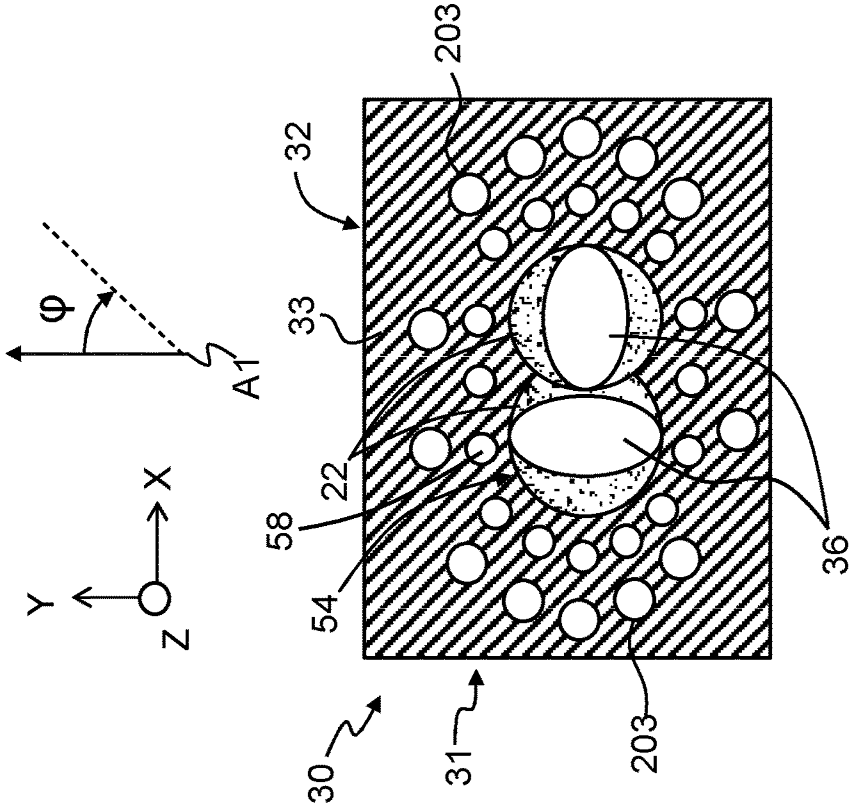
FIG. 4B is similar to FIG. 4A and shows both cooling bores and heating-element bores formed in the extruder barrel wall.
Figure 4A:
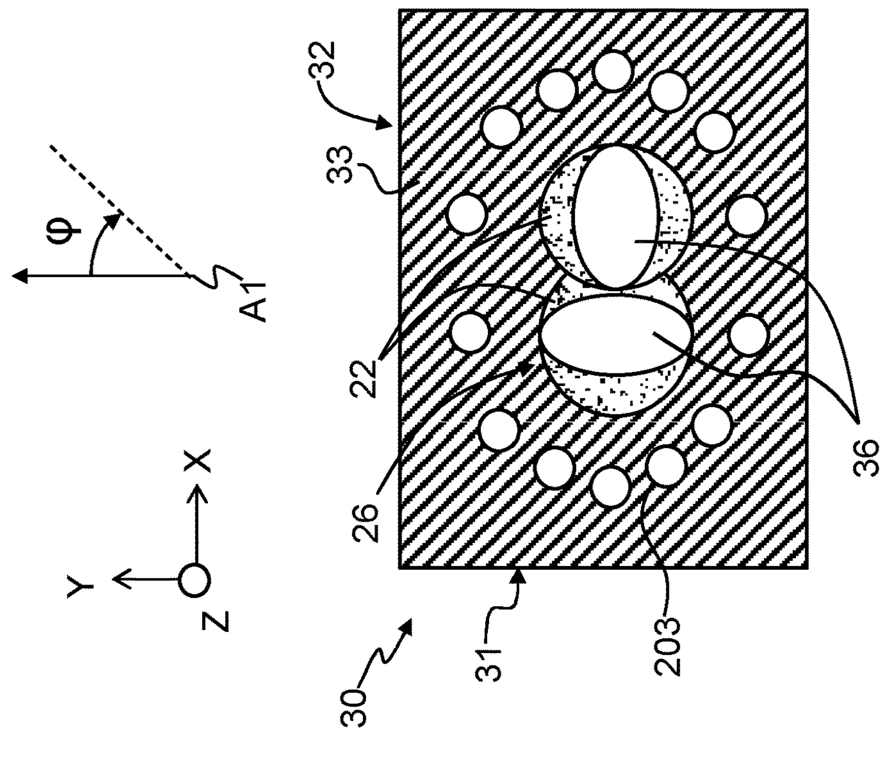
FIG. 4A is a cross-sectional view of an example front-section of the extruder cavity, showing cooling bores formed in the extruder barrel wall.

FIG. 4A is a cross-sectional view of an example extruder 30 wherein wall 33 of input section 32 has a rectangular cross-sectional shape and shows cavity 26 within which the twin extrusion screws 36 reside. The cavity 26 is shown filled with ceramic batch material 22, which is pushed forward by the rotation of extrusion screws 36. The input section 32 also includes longitudinally running cooling bores 203 that are configured to carry coolant 204. In an example, cooling bores 203 extend to front section 52 and can be used to cool the front section.

Thus, in an example embodiment, in place of a cooling jacket 200, coolant 204 is flowed through cooling bores 203 formed directly in input section 32 of barrel 31. The cooling bores 203 are fluidly connected to coolant return 224 and coolant supply 230. Moreover, cooling system 300 can be configured such that the flow of coolant 204 is controlled though sets of cooling bores 203 to provide localized cooling of ceramic batch material 22. This can be accomplished using multiple input and output ports 212 and 214 and multiple actuator valves 240 and flow controllers 260 so that the amount of coolant flow can be varied with azimuthal angle φ.

In an example shown in FIG. 4B, cooling bores 203 and heating-element bores 58 are both formed in barrel wall 33 in input section 32. Various configurations of cooling bores 203 and heating-element bores 58 can be used beyond the illustrative example configuration shown in FIG. 4B. As noted above, cooling bores 203 can extend to front section 52 and can be used to cool the front section.

In the example embodiment of system 10 as illustrated in FIG. 2B, cooling system 300 is operated with a substantially constant flow of coolant 204 to provide a substantially constant cooling rate of front section 52 and thus ceramic batch material 22 flowing therethrough. In an example, front section 52 is cooled to a set temperature $T_{SET}$ as defined by cooling system 300. If no electrical power is applied to any of the heating elements 150 from temperature controller 110, then the temperature of ceramic batch material 22 will decrease and ultimately be driven to match set temperature $T_{SET}$ of cooling system 300.

If power is then applied to heating elements 150 in a select manner using power signals SP from temperature controller 110, then ceramic batch material 22 will be heated in a corresponding manner. Since variations in temperature are common within ceramic batch material 22 during the extrusion process, it is anticipated that non-uniform heating via heating elements 150 will need to be applied in order for the ceramic batch material to have a substantially uniform temperature and generate an extrudate 90 with a substantially uniform temperature. Also, the non-uniform heating may be used to provide a select temperature non-uniformity to ceramic batch material 22 to achieve a desired effect on extrudate 90, such as the limitation of bowing or other deviations from an ideal extrudate shape.

In an example, the flow of coolant 204 in cooling system 300 is substantially constant and has a fixed set-point temperature $T_{SET}$. In this case, flow controller 260 need not be connected to temperature controller 110 so that cooling system 300 can operate in a stand-alone mode, such as illustrated in system 10 of FIG. 2B. The cooling system 300 controls the operation of actuator valves 240 via control signals SV, and receives flow meter information from flow meters 250 via flow meter signals SF.

In another example embodiment, cooling system 300 varies its flow of coolant 204 in response to the temperature measurements of extrudate 90. In this case, flow controller 260 is connected to and controlled by temperature controller 110 via control signals S1, as illustrated in the example systems 10 of FIGS. 2A and 2C.

As discussed above, apparatus 10 includes temperature sensing unit 100, which has temperature sensors 102 arranged adjacent outer surface 92 of extrudate 90 and operably (e.g., electrically) connected to temperature controller 110. The temperature sensors 102 generate temperature signals ST representative of the measured temperature and send the temperature signals to temperature controller 110.

Figure 5A:
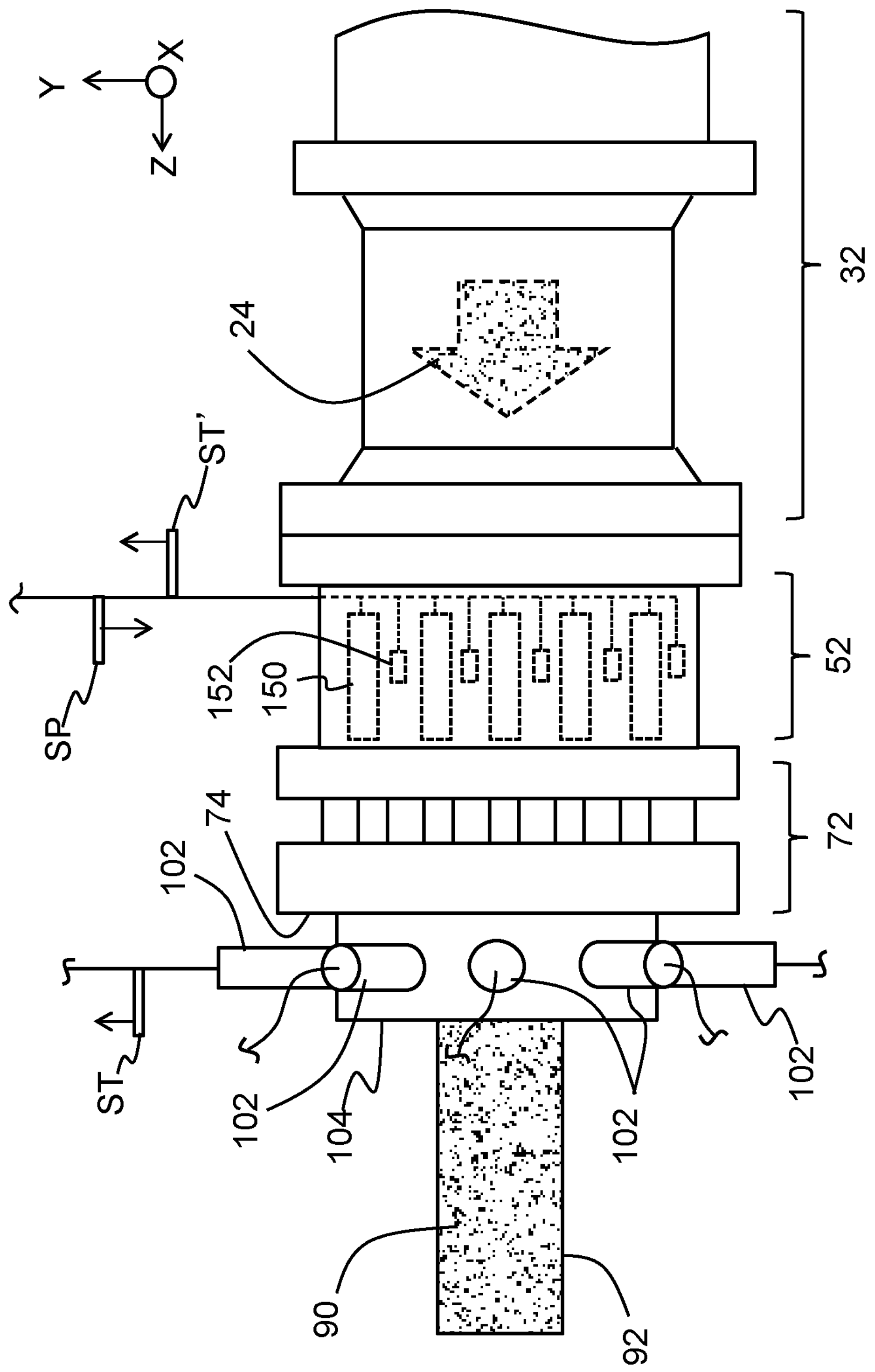
FIG. 5A is a close-up side view of the front section of the extruder, illustrating an example configuration of the two sets of temperature sensors and the set of heating elements.
Figure 5B:
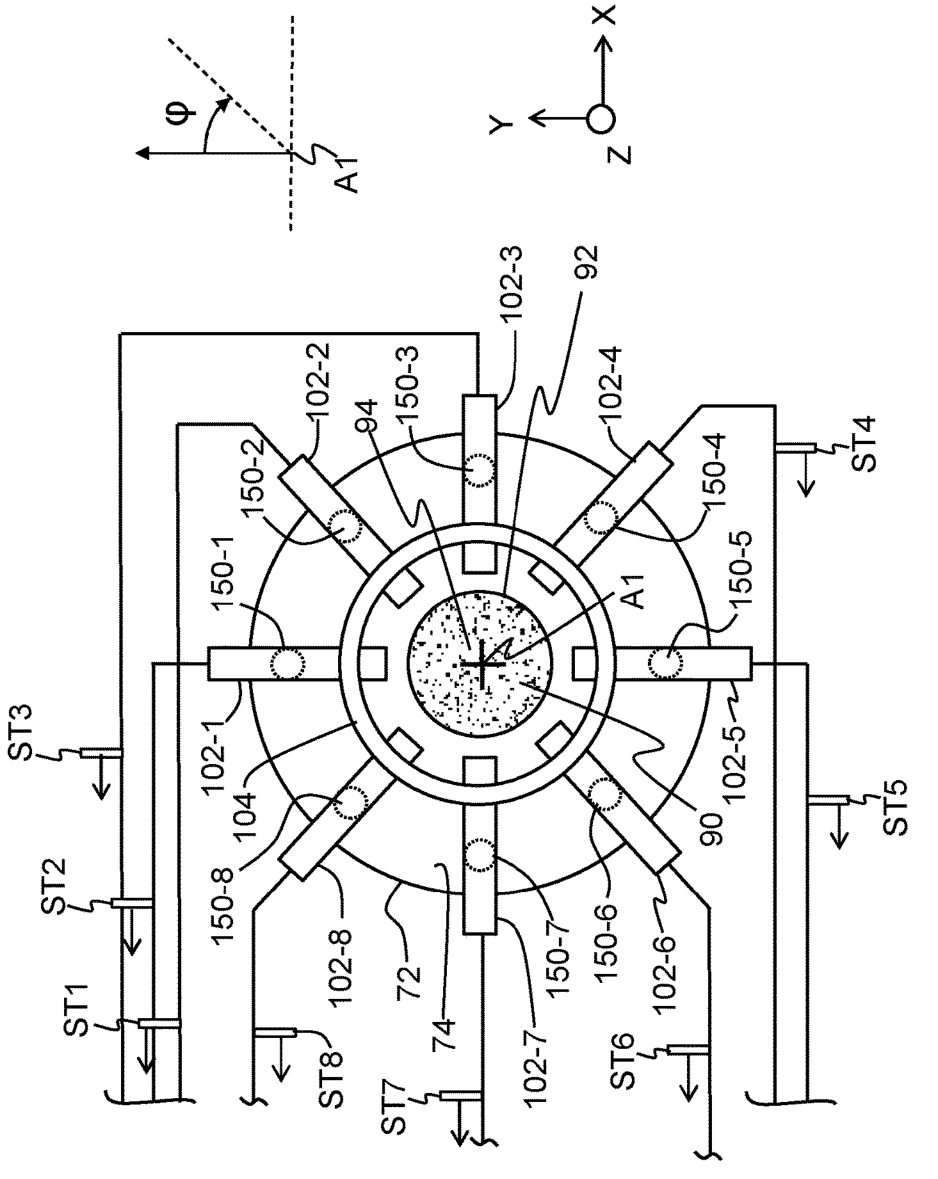
FIG. 5B is a front-on view of the front section of the extruder as shown in FIG. 5A and shows an example configuration for the first set of non-contact temperature sensors used to measure at different locations the outer surface temperatures of the extrudate.

FIG. 5A is a close-up side view of output section 72 and front section 52 of extruder 30, while FIG. 5B is a front-on view of the output section. In an example, temperature sensing unit 100 includes a mounting bracket 104 that attaches to output end 74 of output section 72. The mounting bracket 104 is configured to operably support temperature sensors 102 in a peripheral configuration adjacent outer surface 92 of extrudate 90. In an example embodiment, temperature sensors 102 include or consist of non-contact sensors configured to measure the temperature of outer surface 92. In an example, temperature sensors 102 comprise laser thermocouples or infrared pyrometers.

In an example, temperature sensors 102 are substantially azimuthally aligned with heating elements 150, such as are illustrated in the front-on view of FIG. 5B, with the heating elements shown in phantom behind corresponding temperature sensors 102. The azimuthal angle φ is shown for reference and is measured relative to axis A1. In the example of FIGS. 5A and 5B, there are 8 temperature sensors 102, denoted as 102-1, 102-2, . . . 102-8. Likewise, there are 8 heating elements 150, denoted as 150-1, 150-2, . . . 150-8. The temperature sensors 102 and heating elements 150 are shown as having substantially the same azimuthal positions relative to long axis A1. The temperature sensors 102-1, 102-2, . . . 102-8 generate respective temperature signals ST (ST1, ST2, . . . ST8) that represent the measured temperature at the corresponding portion of outer surface 92 of extrudate 90.

The temperature signals ST are sent to temperature controller 110, which uses the measured temperatures to generate power signals SP that regulate the amount of power provided to heating elements 150 (150-1, 150-2, . . . 150-8) to adjust the amount of heat 101 (see FIG. 3B) generated by each heating element. In an example, this feedback process is used to minimize temperature differences within extrudate 90, i.e., so that the measured temperatures from temperature sensors 102 are made to be substantially the same. Because the flow velocity of ceramic batch material 22 is temperature dependent, uniformizing the temperature of extrudate 90 serves to substantially uniformize the flow rate of ceramic batch material 22 through front section 52 and out of extrusion die 80 of output section 72.

In an example where temperature sensors 152 are employed, these temperature sensors also provide temperature signals ST' (ST'1, ST'2, . . . ST'n) to temperature controller 110 so that the amount of power provided to heating elements 150 can be carefully regulated to provide a select temperature distribution for ceramic batch material 22. More generally, the feedback from temperature sensors 152 can provide several different functions, from regulating the heater temperature (through power manipulation), to limiting the heater output, to detecting whether the heater is malfunctioning (e.g., over-heating or under-heating).

Thus, aspects of the disclosure include a method of extruding ceramic batch material 22 using system 10. The method includes measuring temperatures of different portions of outer surface 92 of extrudate 90 using temperature sensors 102 and generating corresponding temperature signals ST that are representative of the measured temperatures. The method also includes temperature controller 110 using the temperature signals ST to regulate the amount of heat 101 generated by heating elements 150 to substantially uniformize the measured temperatures of extrudate 90.

In an example, the temperature associated with heating elements 150 is measured by corresponding temperature sensors 152 that generate temperature signals ST' that are representative of the measured temperatures. The temperature signals ST' are sent to temperature controller 110 to provide temperature feedback control for heating elements 150 so that the temperature controller can control the amount of power it provides to the heating elements via power signals SP.

Variations in the temperature of outer surface 92 of extrudate 90 can lead to flow instabilities and malformed ceramic articles made from the extrudate. The amount of heat 101 that heating elements 150 need to apply depends on the composition of ceramic batch material 22 and its sensitivity to temperature changes. The localized control of the temperature of ceramic batch material 22 allows for adjusting the skin (outer surface) flow velocity of the ceramic batch material at discrete locations about outer surface 92 of extrudate 90. It also provides the ability to control peripheral versus center flow (flow front), the ability to control bow, and the ability to reduce variations in the temperature of ceramic batch material 22 as it flows through extrusion die 80.

In the configurations of system 10 shown in FIGS. 2A, 2B and 2C, heating control via heating elements 150 can be achieved by a cascaded (PID) control loop. The inner loop controls the temperatures of heating elements 150 with feedback provided by temperature sensors 152, which generate temperature signals ST'. The outer loop controls the temperature of outer surface 92 of extrudate 90 by virtue of temperature sensors 102 providing temperature signals ST. In an example where cooling system 300 is used for cooling, a cooling control loop is employed that includes either a single or multiple cooling zones at front section 52. The cooling loop can be set to a fixed cooling level. The cooling loop itself can include a PID loop that adjusts the flow of coolant 204 via selective activation of actuator valves 240 via control signals SV against the coolant flow rates measured by flow meters 250, which provide feedback signal(s) SF.

In the configuration of system 10 as shown in FIG. 2C, there are multiple heated zones in front section 52, along with one or more cooling zones around the front section. The heating and cooling control is achieved using temperature controller 110 and flow controller 260. The temperature controller 110 includes a cascaded (PID) heating control loop. The inner loop controls the temperatures of heating elements 150 with feedback signals ST' from temperature sensors 152. The outer loop controls the temperature of outer surface (skin) 92 of extrudate 90.

The temperature controller 110 also adjusts the cooling control loop(s) in a manner that seeks to prevent one or more heating elements 150 from reaching saturation, i.e., 0% or 100% output, while still achieving the primary objective of controlling the temperature distribution of extrudate outer surface 92. In this example, the cooling loop would add cooling flow and/or decrease the temperature of coolant 204 if one or more heating elements 150 reached 0% output while exceeding set temperature $T_{SET}$ for the associated azimuthal positions on outer surface 92 of extrudate 90. Alternatively, the cooling loop would decrease flow and/or increase the temperature of coolant 204 if one or more heating elements 150 reached 100% output while falling short of set temperature $T_{SET}$ for the associated azimuthal positions on outer surface 92 of extrudate 90.

There are a number of ways the temperature control (and thus the shape control) of extrudate outer surface 92 can be accomplished using the different embodiments of system 10. In one example, temperature control is accomplished using feedback control, e.g., fuzzy logic, PID or the like. Coolant-flow set point(s) $F_{SET}$ can be adjusted to maintain one or more heating elements 150 within a controllable output range, e.g., 0% to 100% or 10% to 90% of their output range.

In another example, a feed-forward controller is employed, such as one that performs model-based control, that adjusts the output of the cooling loop(s) based on the desired extrudate temperature(s), the expected heating-element output(s), and the modeled interaction of the coolant loop with the heater loops to maintain the heater outputs within the desired controllable range while achieving the desired temperature goals for extrudate 90. The inner coolant control can be based on PID loop(s) that acquire(s) coolant-flow set point(s) $F_{SET}$ from temperature controller 110 and adjusts one or more actuator valves 240 against the coolant-flow feedback signals SF from corresponding one or more flow meters 250 to achieve the desired flow rate(s) of coolant 204.

In an example, system 10 is used to raise or lower the temperature of outer surface 92 of extrudate 90 to maintain a desired temperature differential between the outer surface and extrudate core 94. This enables flow front control of extrudate 90, which affects shape, center and peripheral swollen webs, and skin quality.

In another example, system 10 is operated to stabilize the temperature of extrudate outer surface 92 to reduce or eliminate temperature variation as a source of skin flow instability.

In another example, system 10 is operated to locally control the flow of ceramic batch material 22 without the need for hardware adjustments. For example, system 10 can be employed to control log bow by providing a temperature offset for extrudate outer surface 92 at opposite sides.

In an example, temperature controller 110 receives temperature feedback signals ST and adjusts the power output to heating elements 150 directly. The adjustment of the amount of power delivered to heating elements 150 can be achieved using the PID loops by way of example. In practice, other known control schemes can be employed for the same purpose. In this example, system 10 can operate with or without temperature sensors 152 and with or without cooling system 300.

In a configuration where system 10 also includes temperature sensors 152, these temperature sensors can provide additional functionality to the system. For example, temperature sensors 152 can be used as limit-sensing devices to indicate if a given heating element 150 is overheating or has failed. Alternatively, temperature sensors 152 can be used to provide separate feedback signals for a temperature control loop for heating elements 150 in conjunction with temperature sensors 102, which are used in feedback loops for temperature control of extrudate 90. In this case, the temperatures of heating elements 150 can be the inner loop of a cascaded control loop, for example, a PID loop, where the heating-element temperature signals ST' are fed back to the temperature controller 110. The temperature controller 110 can then modify the amount of power provided to a given heating element 150 to achieve the desired heating-element temperature. In this example, the outer control loop includes the extrudate surface temperature sensors 152.

The temperature signal ST reads the temperature of the extrudate outer surface 92 and outputs a set temperature $T_{SET}$ to the inner heater control loop. The inner heater control loop then acts to control the heating-element temperature by reading the heating-element temperature signal ST' from temperature sensors 152 and adjusting the heater power, as previously described. In this example, the inner control loop can be implemented by any of a number of control schemes, including a PID control loop.

Also in this example, the extrudate temperature control loop can employ any of a number of control schemes. The selection of a particular control scheme depends on the dynamics of the control system, such as process gain, time constant and dead time as well as the desired response dynamics. In many cases, a simple PID control loop can suffice, but long dead times or variable process gains might require the selection of a different control scheme. Typically, the process dynamics are tested to determine whether a simple cascade PID loop would suffice to achieve the desired process performance.

In a configuration that uses cooling jacket 200, multiple scenarios can exist. The simplest is illustrated in FIG. 2B, wherein there is a single cooling jacket 200 around a multitude of heaters on the middle section of extruder 90. In this configuration, the coolant flow and/or coolant temperature can be operated in an open loop (i.e., without feedback control) to manage the temperature range over which heating elements 150 can control the skin temperature of ceramic batch material 22. For example, if the average outer surface temperature of extrudate 90 were too high as measured by temperature sensors 102, then the flow of coolant 204 can be increased (e.g., manually) or the coolant temperature can be decreased (e.g., manually) to achieve the desired extrudate peripheral temperature range. Thus, the flow of coolant 204 can be used as a cooling control knob at a constant coolant temperature. Also, the temperature of coolant 204 can be used as a control knob at a constant coolant flow. In addition, a combination of the flow of coolant 204 and the temperature of the coolant can be used to widen the range of temperature control in the case where cooling system 300 is configured for both flow and temperature coolant control.

The cooling jacket 200 can also be operated in a closed-loop control mode, as illustrated in FIG. 2C. In this case, coolant flow set point $F_{SET}$ as set by control signal S1 is issued from temperature controller 110 to flow controller 260. This flow set point $F_{SET}$ is issued in response to either a deviation from the desired temperature range of extrudate outer surface 92 as measured by temperature sensors 102 or the saturation of one or more heating-element outputs in the effort to achieve the desired extrudate temperatures.

Saturation of the output of a given heating element 150 can be defined as temperature controller 110 running the heating element at 0% output (meaning the measured extrudate temperature is above the desired temperature) or 100% output (meaning the extrudate temperature is below the desired temperature), and as the desired extrudate temperature not being achieved within an allowable time frame. The allowable time frame can be related to the response time and dead time of the process.

If heating elements 150 are saturated at 0%, temperature controller 110 can respond by requesting more cooling from flow controller 260 via control signal S1. The flow controller 260 responds by increasing the cooling of front section 52, forcing the overall temperatures to decrease and the saturated heating element(s) 150 to begin operating in a controllable range once again.

Conversely, if one or more heating elements 150 are saturated at 100% output, then temperature controller 110 can respond by requesting less cooling from flow controller 260 via control signal S1. The flow controller 260 responds by decreasing cooling of front section 52, forcing the overall temperature to rise and the saturated heating element(s) 150 to begin operating in a controllable range.

In the case where some heating elements 150 are saturated at 0% and some are saturated at 100%, a control scheme can be implemented that decides whether to increase cooling, decrease cooling, or take no action based on the process objectives. The cooling control loop would typically be implemented with a PID loop, but, depending on the process dynamics, a more sophisticated control strategy may be needed, e.g., to deal with non-linear behavior or long dead-times.

FIG. 2A illustrates an example embodiment of system 10, where there exists multiple cooling loops positioned azimuthally coincident with the multiple heating loops. In this example, as in the example where there is a single cooling loop with a flow set point $F_{SET}$ as defined via control signal S1, each cooling loop would receive a flow set point from temperature controller 110, which determines the output of the individual cooling loops. In one example, the coolant temperature of cooling system 300 can be adjusted globally (i.e., using a single value for the coolant temperature for all coolant loops). In another example, the coolant flow to individual azimuthal positions can be adjusted independently, allowing for localized azimuthal control of the temperature of extrudate outer surface 92.

Each of these individual control loops can be implemented in essentially the same manner as the single control loop as described above. In this case, the coolant temperature set point can be adjusted up or down, depending on the average output of heating elements 150. This provides either a lower coolant temperature if heating elements 150 are tending to saturate at or approach 0%, or a higher coolant temperature if the heating elements are tending to saturate at or approach 100%. In the case where heating elements 150 are not used, the coolant temperature can be based on the whether the average temperature of outer surface 92 of extrudate 90 was being achieved. The coolant temperature can be increased or decreased if the extrudate temperatures were exceeding or falling short of the desired temperatures.

In the case where heating elements 150 are used, the individual coolant loop flows can be managed based on whether associated individual heating zones were at or approaching saturation in the manner described above, i.e., can provide more cooling if heating-element outputs are at or approaching 0% and vice versa. In the case where heating elements 150 are not used, individual coolant flows are dictated by the extrudate surface temperature directly, i.e., by adding cooling to decrease localized azimuthal temperatures and vice versa.

In certain situations, there can be some interaction between adjacent heated or cooled sections around the periphery of front section 52 of extruder 30 of system 10. In these situations, alternative strategies beyond the use of PID control may need to be employed. As will be appreciated by those skilled in the art, the specific control strategy implemented will depend on the physical implementation of system 10, the operating region of the process and the performance criteria required of the system. The flow of ceramic batch material 22 depends on its particular composition, since different compositions have temperature dependencies. Some compositions of ceramic batch material 22 exhibit thinning or lower-pressure behavior while being heated to a certain temperature, wherein an inflection occurs and the composition exhibits stiffening and higher pressure as the temperature increases.

In examples, the systems and methods disclosed herein operate within a select temperature span ranging from the lowest operating pressure to an appreciably stiff or high operating pressure area at higher temperatures. In examples, increasing the temperature of ceramic batch material 22 acts to slow the flow velocity, whereas cooling acts to increase the flow velocity. The temperature span depends on the pressure-versus-temperature response of various compositions of ceramic batch material 22. In an example, the temperature span can have decreasing pressure with increased temperature for a period of time, and then may inflect and start to increase pressure with further increased temperatures. Generally speaking, different compositions of ceramic batch material 22 need to be controlled differently, e.g., over different temperature ranges.

Figure 6:
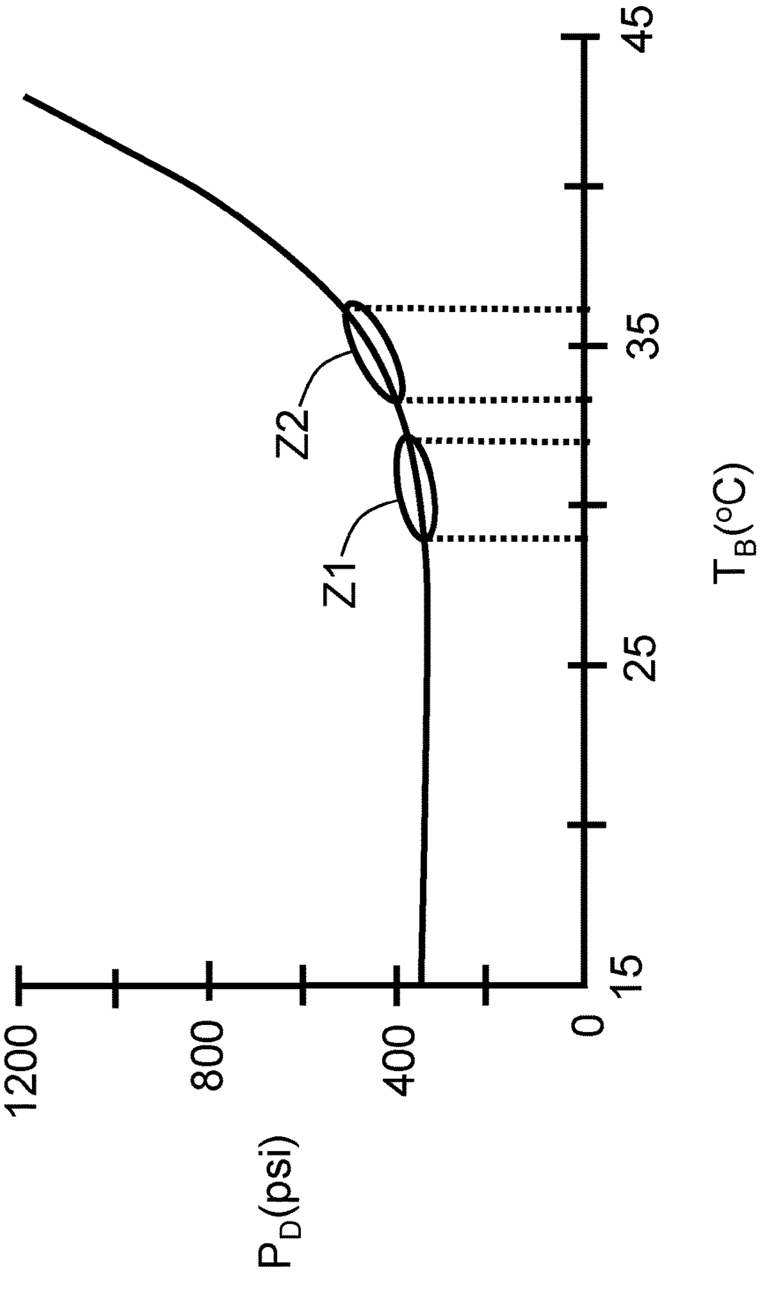
FIG. 6 is a plot of the die pressure PD (psi) versus the batch temperature $T_B$ (° C.) (core and skin temperature) illustrating how the batch temperature can affect the die pressure, which is determined by the batch flow rate.

FIG. 6 is a plot of the die pressure $P_D$ (psi) versus the batch temperature $T_B$ (° C.) (core and skin temperature) illustrating how the batch temperature can affect the die pressure, which is determined by the batch flow rate. The curve is a hand-drawn fit to measurement data. By forcing a temperature difference between the core and the periphery of ceramic batch material 22, the rate at which different areas of the ceramic batch material flow through extrusion die 80 can be controlled. The plot of FIG. 6 shows two zones, Z1 and Z2. The zones Z1 and Z2 have different flow velocities due to the pressure required to push ceramic batch material 22 through extrusion die 80.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

What is claimed is:

1. A method of controlling a shape of an extrudate made of ceramic batch material extruded from an extrusion die of an extruder, comprising:

flowing the ceramic batch material through an extruder cavity defined by an inner surface of a barrel wall immediately adjacent the extrusion die, wherein the batch material has a temperature and wherein the extruder cavity has a central axis and defines a perimeter of the ceramic batch material;

locally adjusting the temperature of the ceramic batch material that resides within the extruder cavity through the perimeter of the ceramic batch material at multiple locations, with heating elements azimuthally arranged about the central axis, to form a temperature-adjusted ceramic batch material;

measuring temperatures of the barrel wall, wherein the measuring of the temperatures of the barrel wall is performed with barrel temperature sensors mounted at multiple locations around the perimeter of the ceramic batch material within the extruder cavity, the barrel temperature sensors azimuthally arranged about the central axis in the same manner as the heating elements that locally adjust the temperature of the ceramic batch material, each of the barrel temperature sensors arranged adjacent to one of the heating elements;

extruding the temperature-adjusted ceramic batch material through an output end of the extrusion die to form the extrudate, with the extrudate having an outer surface; and measuring temperatures of the extrudate at the output end of the extrusion die with extrudate temperature sensors at multiple outer surface locations of the extrudate having different azimuthal positions that are substantially azimuthally aligned with the heating elements about the central axis, the extrudate temperature sensors being supported by a mounting bracket attached to the output end of the extrusion die, wherein the locally adjusting the temperature of the ceramic batch material is conducted to control the shape of the extrudate based on a feedback loop comprising the measured temperatures of the barrel wall and the measured temperatures of the extrudate at the output end of the die.

2. The method of claim 1, wherein the locally adjusting the temperature of the ceramic batch material includes either locally heating the ceramic batch material through its perimeter or locally heating and cooling the ceramic batch material through its perimeter.

3. The method of claim 2, wherein the cooling is accomplished by flowing a coolant, and wherein the coolant flow is maintained substantially constant.

4. The method of claim 2, wherein the cooling is accomplished by flowing a coolant, and wherein at least one of the coolant flow and extrudate temperature is adjusted based on the measured temperatures of the multiple outer surface locations of the extrudate.

5. The method of claim 4, wherein the coolant flow varies as a function of an azimuthal angle defined relative to the cavity central axis.

6. The method of claim 2, wherein the heating is applied non-uniformly so that the extrudate has a substantially uniform cylindrical shape.

7. The method of claim 2, further comprising:

performing the locally heating the ceramic batch material by using multiple heating elements, each element having a heating element temperature defined by an amount of electrical power provided to each of the heating elements;

measuring the heating element temperatures; and controlling the measured heating element temperatures in a second feedback loop.

8. The method of claim 7, wherein the steps of measuring the heating element temperatures and measuring the temperatures of the extrudate are performed at substantially the same azimuthal positions.

9. The method of claim 2, wherein measuring temperatures of the extrudate at multiple outer surface locations includes:

arranging the extrudate temperature sensors about the outer surface of the extrudate, each extrudate temperature sensor comprising a non-contact temperature sensor;

generating temperature signals from the extrudate temperature sensors; and receiving the temperature signals from the extrudate temperature sensors at a temperature controller configured to control the local adjustment of the temperature of the ceramic batch material.

10. The method of claim 1, wherein the extrudate has a skin having a thickness, and wherein the locally adjusting the temperature of ceramic batch material is performed in a manner that controls the skin thickness.

11. The method of claim 1, wherein the measuring temperatures of the barrel wall is performed at multiple azimuthal locations around the perimeter of the ceramic batch material within the extruder cavity.

12. The method of claim 1, wherein the locally adjusting the temperature of the ceramic batch material that resides within the extruder cavity further comprises heating the barrel wall at multiple locations around the perimeter of the ceramic batch material.

13. The method of claim 1 wherein the extrudate temperature sensors comprise laser thermocouples or infrared pyrometers.

* * * * *